United States Patent [19]
Jaquette et al.

[11] Patent Number: 5,309,420
[45] Date of Patent: May 3, 1994

[54] DISCRIMINATOR FOR DETECTING SIGNAL PRESENCE ON OPTICAL MEDIA

[75] Inventors: Glen A. Jaquette; William C. Williams, both of Tucson, Ariz.

[73] Assignee: International Business Machines Corporation, Armonk, N.Y.

[21] Appl. No.: 972,579

[22] Filed: Nov. 6, 1992

[51] Int. Cl.⁵ ............................................. G11B 27/36
[52] U.S. Cl. ...................................... 369/58; 377/39; 377/44; 377/45
[58] Field of Search ....................... 377/10, 11, 12, 37, 377/39, 44, 45, 50; 360/53, 58, 131, 31; 369/58, 54

[56] References Cited

U.S. PATENT DOCUMENTS

| | | | |
|---|---|---|---|
| 3,863,228 | 1/1975 | Taylor | 360/53 |
| 4,695,991 | 9/1987 | Hudson | 369/44 |
| 4,791,622 | 12/1988 | Clay et al. | 369/59 |
| 4,914,661 | 4/1990 | Mester | 371/40.1 |

FOREIGN PATENT DOCUMENTS 1-294287 11/1989 Japan .

Primary Examiner—Timothy P. Callahan
Assistant Examiner—Shawn Riley
Attorney, Agent, or Firm—Greenlee and Winner

[57] ABSTRACT

To sense the presence of written data on an optical disk, the readback signal from the disk is detected, and the intervals between detected signal events are measured. That signal event occurring at an expected time delta after the preceding signal event indicates a valid data signal time delta. Those signal events occurring at an unexpected time delta after the preceding signal event indicates the readback signal to be noise. If the count of valid signal time deltas minus the unexpected time deltas attributed to noise accumulates rapidly along a given track within a given sector of the optical disk that sector is determined to be written. Provision is made for counting signal events in accordance with the specific run-length limited in use.

6 Claims, 4 Drawing Sheets

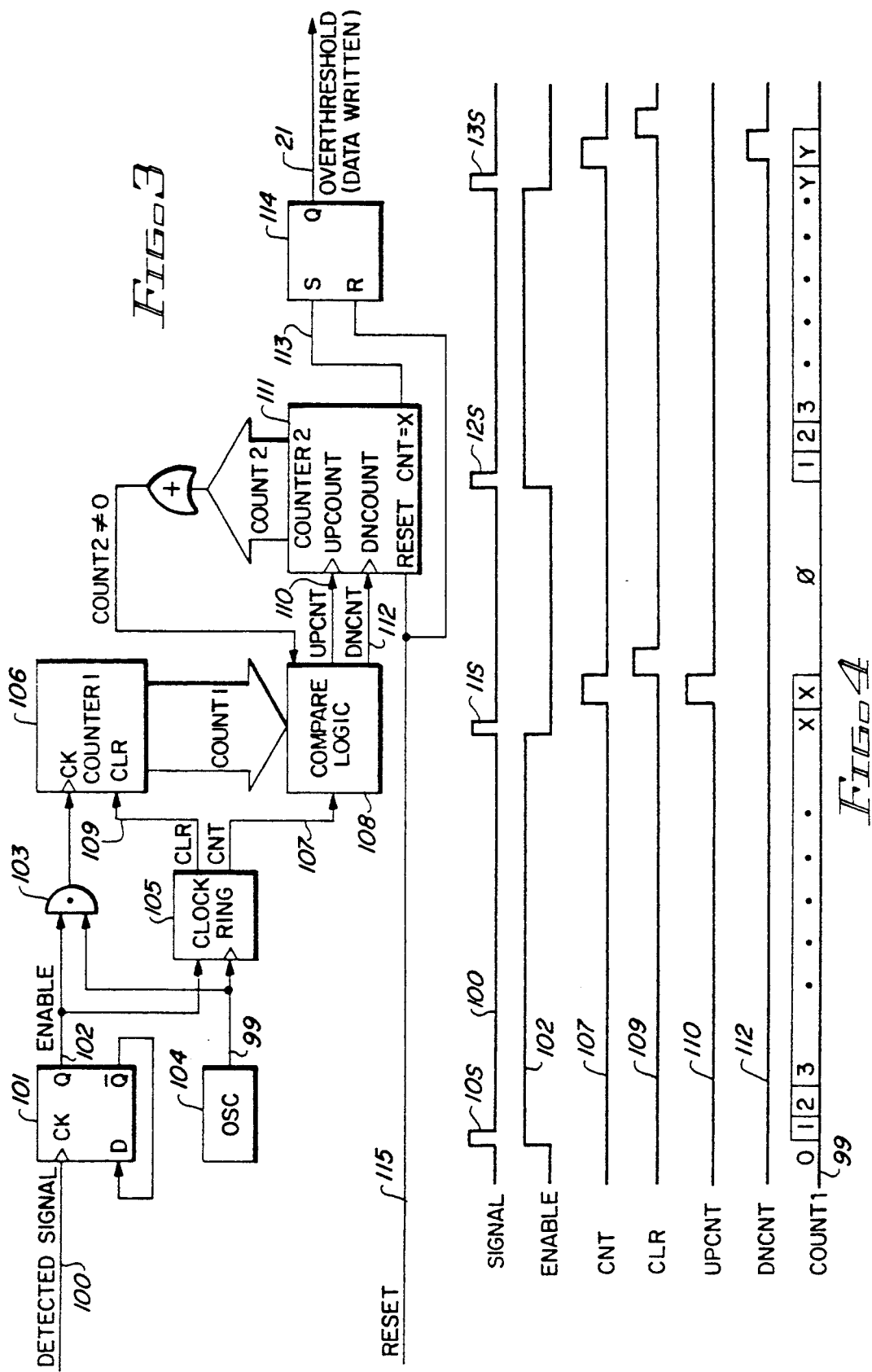

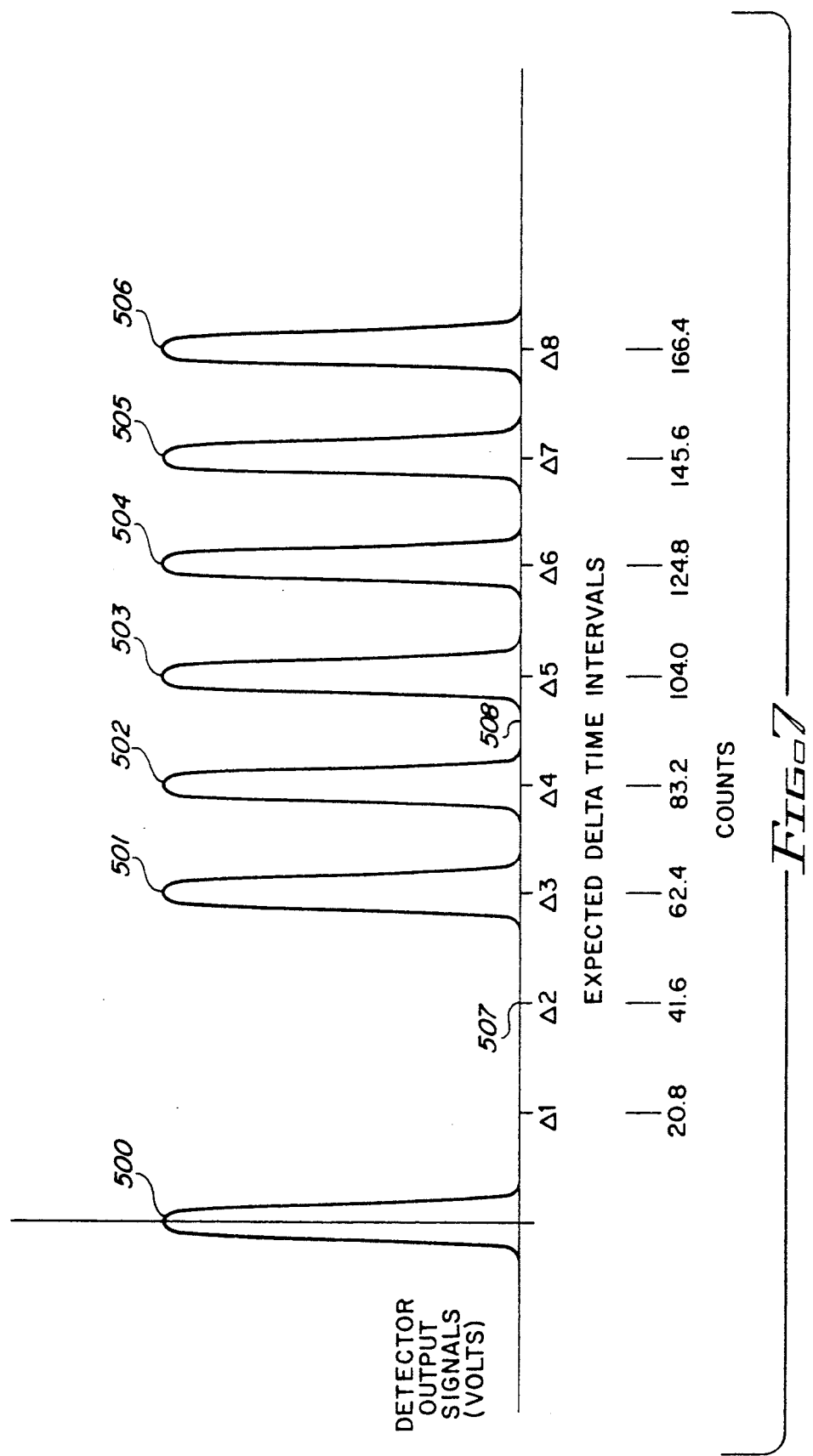

DISCRIMINATOR FOR DETECTING SIGNAL PRESENCE ON OPTICAL MEDIA

This invention relates to the preservation of user data on optical disk media by providing apparatus to discriminate between noise and data to ascertain the presence of data signals and thereby avoid overwriting user data.

BACKGROUND OF THE INVENTION

Optical disk devices are used for the storage of computer-prepared data and have recognized value in their ability to store large quantities of data. The media for use in such devices is reactive to bursts of light, such as may be produced by the rapid switching of a semiconductor laser. In order to write data on optical media, the laser power must be controlled at a fairly high power level, in order that the media can be altered in accordance with an input data stream. In reading the data back, the laser power level is controlled to a lower level so that the media is not altered by the laser beam but the reflected light indicates the presence or absence of media alterations in accordance with the recorded input data stream.

Optical media is of two general types, media which can be written only once and media which can be written, erased, and written again. Write-once media (WORM) is permanently altered when write power levels are produced by the laser beam. Erasable media, such as magneto-optic (MO) media, is not permanently altered when data is written. In the MO media, the magnetic orientation of the reactive material is altered in the writing process, and in the erasing process, the magnetic orientation is reordered.

When reading MO data from an optical disk, the remanent magnetization of one or the other polarity rotates the linear polarization of a reflected light beam creating P and S polarization components. By detecting these components of the light beam, an MO data signal is generated.

To readback data contained on write-once media, the reflected light beam is intensity modulated by the permanent condition of the disk. By detecting the intensity of the reflected light beam, a Read Only Memory (ROM) signal is generated in accordance with the WORM data.

In operating an optical disk system, it is necessary to identify the particular sector and track upon which the laser beam is directed That identification information is included in sector headers stamped onto the disk itself at the beginning of each sector and is, therefore, of a write-once nature. All current Optical Disk standards use stamped headers, but there are proposed standards where the disk is soft formatted, that is the headers are written in the optical disk system. The inventive system disclosed herein will work equally well with either standard. The user area, that is the data area, which follows the sector header may be either write-once or erasable.

In writing to optical disk media, it is imperative to determine when the user area of a sector has been written or partially written in order to avoid overwriting and thereby destroying data already written to the user area. To do that, the small computer system interface (SCSI) command MEDIUM SCAN is provided. This command can be utilized for both WORM and MO media. When using the command, two format fields can be utilized to determine whether a sector has been written. The first field is the flag field which is written before the user data field in WORM media and sometimes in MO media (optional for MO). The second field is the user data field itself, together with its associated error correcting code (ECC). Use of the flag field alone does not yield a sufficiently reliable determination of whether a sector has been written since defects larger than the flag field (5 bytes) are relatively common in optical recording. The value of the flag field is used primarily as a fail-safe mechanism to abort a write operation on a sector when a flag field is detected.

In erasable media, for example MO, sector directory tables located on the media itself are often used. These tables enable the controlling logic to determine which sectors have been written without checking the sector itself. However, in some MO operating systems it is desirable to read ahead, and that involves reading sectors past the current target sector in anticipation of future accesses. An operation of that type does not involve the checking of directory tables to determine if the sector is blank or not. As a consequence, it is desirable to have a reliable method of determining whether a sector is blank to increase system performance.

In a WORM system, directory tables do not exist and the MEDIUM SCAN command is used to determine whether a sector is written or not. As discussed above, the detected presence or absence of the flag field alone is not sufficiently robust, and therefore it is necessary to scan the user data field to determine whether it has been written.

When checking the user data field, a blank field may be misdetected as written due to noise in the system. For this reason, apparatus and method to reliably detect when a sector has been written, is needed. The solution is a detection technique and apparatus which is more reliable, quicker and easier to implement than previous schemes for detecting data within these format-sensitive areas.

SUMMARY OF THE INVENTION

This invention provides a technique and apparatus for detecting the presence of user data on optical media by detecting all signal events present on that media, whether derived from data or noise and then discriminating between the two in order to statistically determine the presence or absence of data within the user area. All detected signal events are counted and a discrimination is made between those signal events which occur at time deltas expected between valid signal events and those signal events which occur at time deltas not expected between valid signal events. In that manner, those signal events occurring at time deltas not expected between valid signal events, are identified as noise signal events, while those signal events occurring at expected time deltas could be either noise or actual data signal events. Circuits are provided which count down whenever noise is experienced and up whenever a signal event occurs at a time delta when data is expected. The count achieved at the end of a statistically significant period will achieve a level indicating a written sector only when data has been actually written.

The preceding scheme also includes the provision of a no-count whenever signal events occur at time deltas that cannot be clearly identified as either an expected time delta for data signal events or an unexpected time delta for such signal events.

The inventive apparatus includes an oscillator providing clock pulses at a non-integer multiple of the time between expected data signals. A counter is enabled to count the number of clock pulses occurring between detected signals received from the optical disk. That number of clock pulses is provided to compare logic circuits for establishing whether a signal received from the optical disk occurred at a time at which data could be expected or at a time when data is not expected. As a result of that determination, a second counter is counted up or down. When a count in the second counter reaches an appropriate threshold, it has been determined that the sector under inspection is written with data.

The invention contemplates the use of data which has been written to the optical disk according to a run length limited (RLL) code by appropriately programming the discriminating compare logic circuitry. The apparatus provides appropriate upcount and downcount signals in accordance with the code utilized.

BRIEF DESCRIPTION OF THE DRAWING

The invention is set forth in detail below with reference to the accompanying drawing, a brief description of which follows.

FIG. 3 is a block diagram of the discriminator circuits of this invention for use in the apparatus of FIG. 1.

FIG. 4 is a timing diagram for the circuit of FIG. 3.

FIG. 7 is a drawing showing specific delta times at which data signals can occur according to a specific runlength limited code.

DETAILED DESCRIPTION

Figure 1:
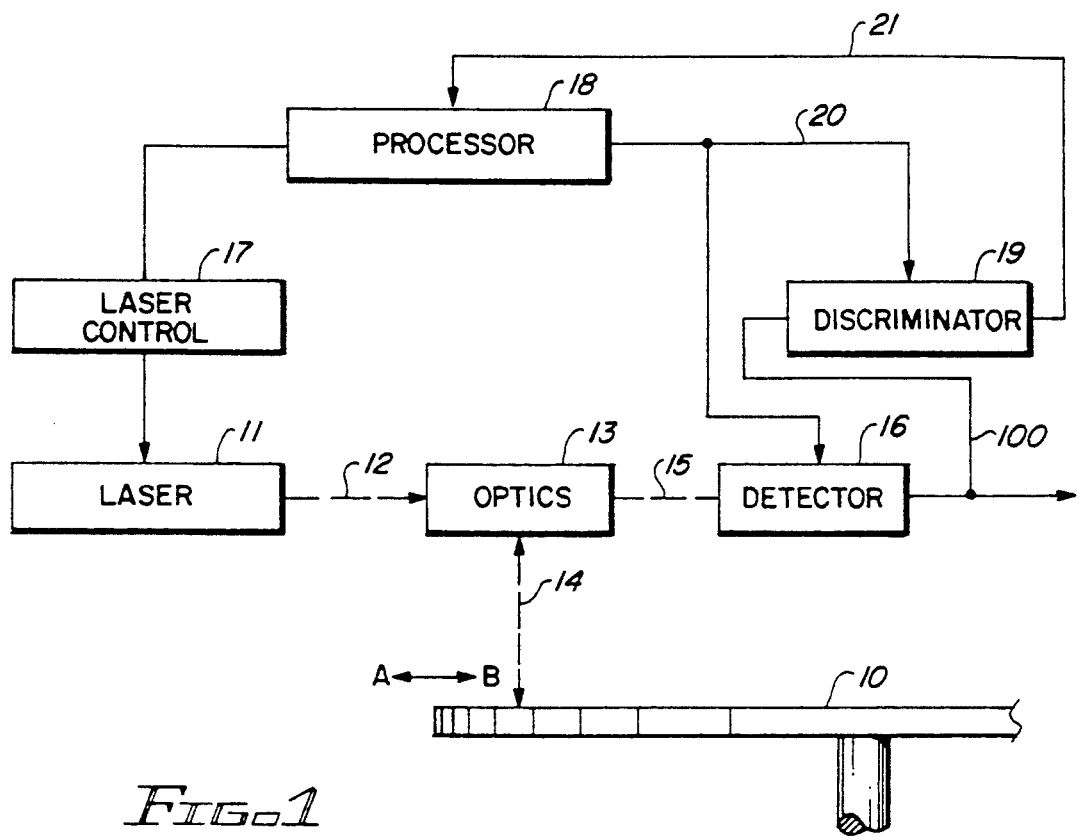
FIG. 1 is a block diagram of optical disk apparatus employing the instant invention.

With reference to the drawing, like numbers indicate like parts and structural features in the various figures.

FIG. 1 shows an optical disk 10 mounted for rotation in an optical disk playback/recorder, the mechanical details of which are not shown. A laser generator assembly 11 produces a light beam over light path 12 to an optical system 13. Optical system 13 directs the laser beam to the surface of disk 10 in order to read or write data on the disk. When reading data, light is reflected from the disk through the optical system 13 along light path 15 to detector 16. Optical system 13 includes elements which are movable in order to direct light over light path 14 to and from any track position On the surface of optical disk 10.

If the optical disk 10 is of the write-once type, when data is recorded on the disk the power of the laser is increased to a level at which a series of pits are burned into the disk by the laser in order to produce a "one" digit. When the system is in a read-back mode, the laser scans the surface of the disk 10 along the chosen track and scans pits recorded within that track. If the disk is of the reflectivity type where the pit produces a non-reflective spot within the reflective surface, the one digit corresponds to the spot in which there is little reflectivity. At the center of the pit the reflectivity is lowest and hence the magnitude of the signal is the greatest, thus providing a peak for detection of the recorded "one".

If the optical disk 10 is of the erasable magneto-optic type, all of the magnetic domains of the disk are initially aligned in the same magnetic direction. In order to write a "one" digit on an MO disk, the laser is used to heat a spot on the disk which is subjected to a reverse magnetic field so that the magnetic domain at that spot assumes a reverse magnetic direction. When reading MO data from the optical disk, the laser is directed at the surface of the disk and the remanent magnetization of one or the other polarity rotates the linear polarization of the reflected light beam in accordance with the well-known Kerr effect. By splitting the reflected beam into P and S orthogonal polarization components, and by detecting the magnitude of those components with photodetectors, an MO data signal is generated identifying the "one" bits and the "zero" bits.

When the light beam strikes the embossed header or ROM portion of the disk, the light does not experience a rotation in polarization upon reflection, but instead the intensity of the light is modulated in accordance with the data that is permanently inscribed into the sector header. The intensity modulated beam is reflected through the optical system 13 to the detector 16 in order to synchronize the detection circuits with the format fields of the disk and to provide the identification of track and sector information that is located in the sector header.

Figure 2:
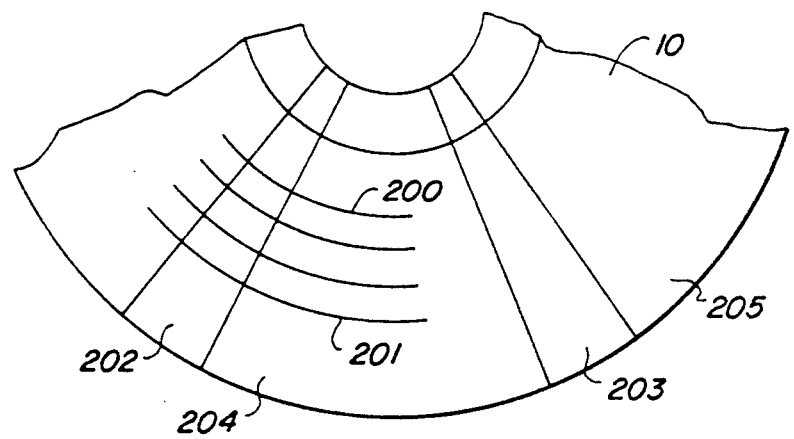
FIG. 2 is a schematic representation of sectors, tracks, sector headers and user areas on a section of a typical optical disk for use with the apparatus of FIG. 1.

FIG. 2 is a schematic representation of a portion of the surface of disk 10 and shows various tracks 201 on the surface of the disk together with sector header regions 202 and 203 which are situated between user areas 204 and 205. For a write-once disk, the pits which represent user data are burned into the user areas 204 and 205. For an MO disk, the magneto-optic region, that is the erasable region, is the user area 204 and 205. As discussed above, the sector header regions 202 and 203 are, at the current time, permanently inscribed with data identifying the particular track and sector and with the sector mark. There are more complicated Optical Disk Formats proposed which involve banded media to increase the capacity of the disk. In that type of format the media is divided into annular bands. In each of those bands, the frequency at which data is recorded is scaled according to the approximate diameter of each band so that the recording density is a constant at the inner diameter of each band. In some banded formats, the headers are not radially aligned as shown in FIG. 2. However, the inventive system herein works equally well for the proposed formats.

The power output of laser 11 is controlled by circuits 17 in order to accomplish either the writing or the reading mode. Microprocessor 18 provides control over the setting of laser power and provides direction to all of the other components in the optical drive, including direction to discriminator 19 over line 20.

FIG. 1 shows a discriminator 19 whose function is to determine whether signals being read from the optical disk 10 represent actual data signals or represent noise. One purpose of the discriminator 19 is to determine when a sector has been written with data so that it is not over-written with new data ruining the data already present. The discriminator 19 receives the output of the detector 16 and after determining whether the sector is written, provides an output to the microprocessor over line 21 indicating whether the sector is available for use. The output of detector 16 is also provided to other circuits not shown for transmittal of data to a host computer.

FIG. 3 illustrates the circuit elements used for discriminator 19. Signals from detector 16 are provided over line 100 to latch 101. When a signal has been detected and the latch is set, an enable signal is provided over line 102 to AND circuit 103. A local clock oscillator 104 a)so supplies pulses over line 99 to the AND circuit 103. The output of circuit 103 is provided to the first counter 106. Oscillator 104 and the flip-flop latch 101 also provide signals to the clock ring circuit 105. Upon the reception of the next signal from detector 16, the enable signal on line 102 is dropped and the clock ring circuit provides a count signal (CNT) over line 107 to compare logic circuit 108 in order to transfer the count in counter 106 to the compare logic circuit 108. A clear signal (CLR) is then provided by the clock ring circuit 105 to reset counter 106. In that manner, counter 106 is reset after counting the number of clock pulses generated by oscillator 104 during the time delta between detected signals.

The compare logic circuit 108 functions to inspect the count sent to it by the first counter 106 to determine whether that count corresponds to a time period (delta time) in which a data signal is expected On line 100. If so, an upcount output is provided over line 110 to a second counter 111. If, however, the count transferred from counter 106 indicates an unexpected delta time on line 100 or indicates a signal on line 100 occurring between expected delta times, a downcount signal is generated on line 112 causing the second counter 111 to downcount by one. Should the count in counter 111 reach a threshold upcount, an output is provided over line 113 to set latch 114 to provide an output on line 21 indicating that the sector contains written data. Should the inspection of signals on line 100 be completed prior to reaching the threshold, it will be determined that the sector is not written.

FIG. 4 is a timing diagram for the circuit of FIG. 3. Signal events from the optical disk 10 are detected and shaped by detector 16 into pulses and provided as shown in FIGS. 3 and 4, on line 100 as input to discriminator 19. The enable signal on line 102 is raised with the first pulse, 10S, and continues high until the next pulse 11S occurs. Signals 10S and 11S may correspond to valid data signal events or one or both may be due to noise spikes. Whenever the first pulse 10S occurs, the enable signal is raised on line 102, and the second pulse 11S causes the enable signal to drop. When the enable signal drops, the count pulse (CNT) 107 is provided from the clock ring circuit 105 and the clear pulse (CLR) 109 is provided upon the dropping of the count pulse 107. If the count of clock pulses on line 99 accumulated in counter 106 between pulses 10S and 11S corresponds to a count, X, that indicates a second pulse has been detected at an expected delta time after the first pulse, compare logic circuit 108 will thereupon provide an upcount signal 110. Should the second pulse 11S have occurred at an unexpected delta time or between expected delta times, a noise spike has been detected and that event triggers a downcount signal on line 112. In FIG. 4, pulse 11S is shown occurring at an expected delta time, with a resultant upcount signal shown occurring on line 110. FIG. 4 illustrates that the first counter 106 counts each clock pulse on line 99 occurring after the first pulse 10S through the time interval to the second pulse 11S. Since the second pulse 11S occurs at an expected delta time, the accumulated count of clock pulses, X, causes compare logic circuit 108 to increase the count in second counter 111 by one.

As shown in FIG. 4, counts are not recorded in counter 106 between the second pulse 11S and the third pulse 12S. A more sophisticated circuit than that shown in FIG. 3 could be provided to count between each and every signal on line 100. However, since a statistical analysis of detected signals is the object, it is sufficient to count every other time delta to determine the presence of valid data. As a consequence, in the embodiment shown, the counter 106 is not enabled between pulses 11S and 12S but is once again enabled by pulse 12S. A count is thereupon provided between pulse 12S and pulse 13S. Should that count equal a downcount quantity Y as shown in FIG. 4, the downcount pulse will be energized on line 112 by the compare logic circuit 108 to cause the second counter 111 to reduce its count by one.

Figure 5:
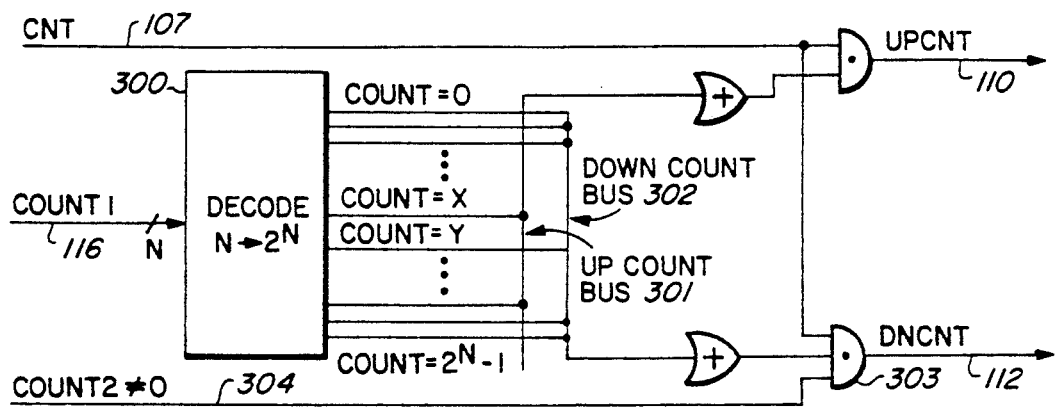
FIG. 5 shows compare logic circuits for use in the circuit of FIG. 3.

FIG. 5 is an implementation of the compare logic circuit 108. The count in counter 106 is received by the compare logic circuit 108 over lines 116 and sent into a decoder 300. If the decoder 300 senses a count of 20 then an output line representing a count 20 is raised. If the decoded count is 15, a line corresponding to a count of 15 is raised. All of those lines which represent counts during a valid delta time interval, that is a count of X, are connected to an upcount bus 301. All of those lines corresponding to an unexpected delta time or a count between expected delta times, that is, a count of Y, are connected to a downcount bus 302. The upcount and downcount bus signals are logically OR'd to enable the upcount line 110 or the downcount line 112 by the count pulse 107. Note also that the second counter 111 is prevented from Counting below zero through the operation of AND gate 303 and line 304.

Figure 6:
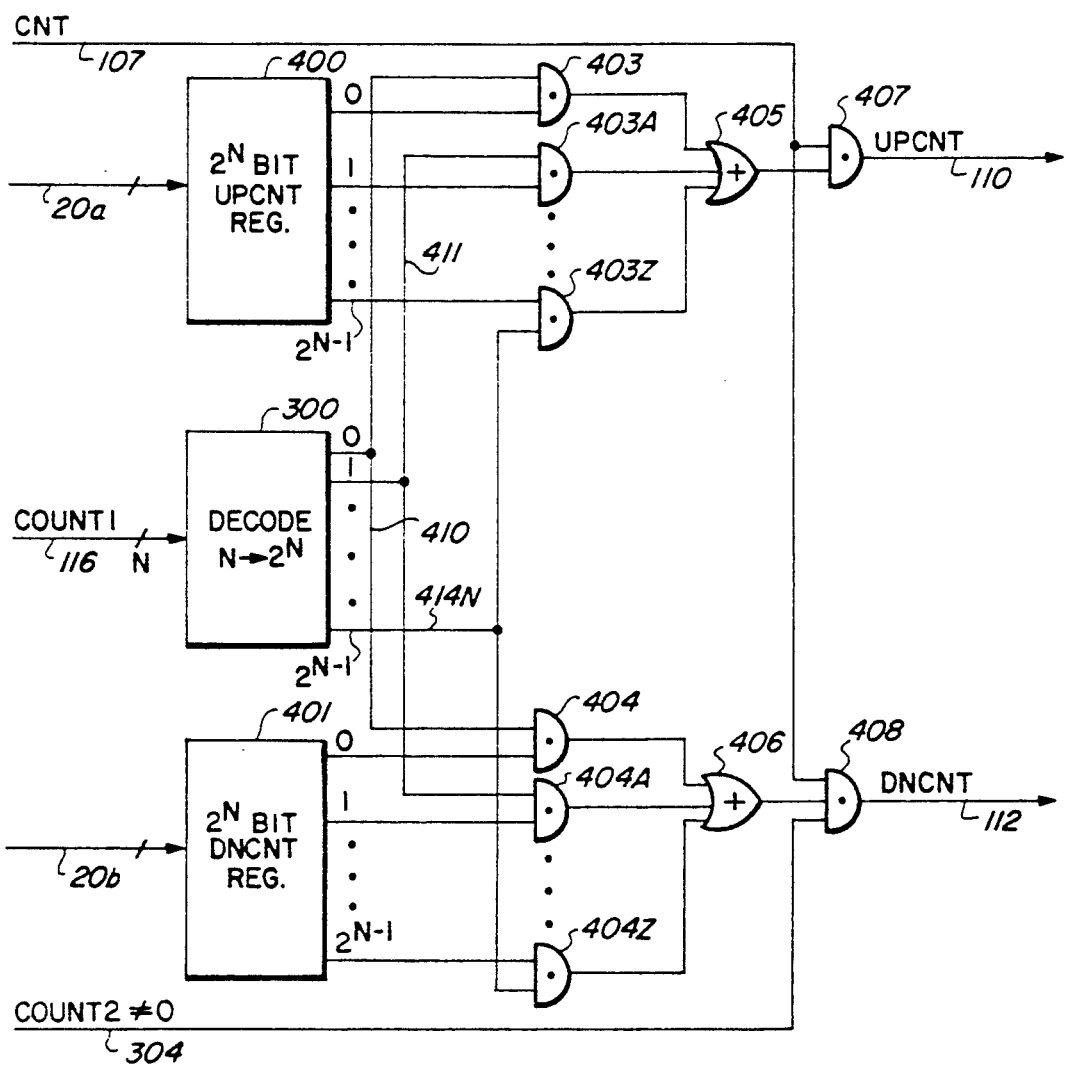
FIG. 6 shows alternative programmable compare logic circuits for use in the circuit of FIG. 3.

FIG. 6 is a programmable implementation of the circuit shown in FIG. 5 and thereby allows the user to provide for any specific run-length limited code or oscillator frequency. In FIG. 6, the count from counter 106 is received by decoder 300 over lines 116. The output of the decoder, if the count is "zero", will raise a signal on line 410 to two AND gates 403 and 404. AND gate 403 is connected to OR circuit 405 which in turn is connected to AND gate 407, the output of which is provided to counter 111 over upcount line 110. AND gate 404 is connected to OR circuit 406 which in turn is connected to AND gate 408, the output of which is provided to counter 111 over downcount line 112.

Should the count from counter 106 received by decoder 300 be a count of "one", the output of the decoder 300 will raise a signal on line 411 to AND gate 403A and to AND gate 404A. For simplicity and ease of understanding FIG. 6, additional lines receiving decoded counts from decoder 300 are shown with a continuation symbol. Within that continuation symbol, if the count from counter 106 is decoded as "two", the output of decoder 300 will raise a signal on line 412, a count of "three" will raise a signal on line 413, etc. Line 412 is connected to AND gates 403B and 404B, line 413 is connected to AND gates 403C and 404C, etc. The number of lines N receiving signals from the decoder 300 equals the maximum count N-1 to which the counter 106 can count, i.e., 0,1,2, ... N-1. A count of N-1 raises a signal on line 414N which is connected to AND gates 403Z and 404Z.

AND gates 403 through 403Z are connected to OR circuit 405 which is connected to AND gate 407, the output of which is connected to upcount line 110 as previously noted. AND gates 404 through 404Z are connected to OR circuit 406 which is connected to AND gate 408 as previously noted.

The circuit shown in FIG. 6 provides an interface over lines 20a and 20b to the processor 18 (shown in FIG. 1). Line 20a is connected to an upcount register 400 and line 20b is connected to a downcount register 401. The output lines of register 400 are connected to the AND gates 403 through 403Z as shown in FIG. 6. Similarly, the output lines of register 401 are connected to AND gates 404 through 404Z.

The circuit shown in FIG. 6 functions as follows. Suppose that the particular run-length limited code in use is a (2,7) code. By that is meant that when data is recorded on the optical disk, successive zeros can occur from a minimum of two zeros in succession to a maximum of seven zeros in succession. Consequently, when reading data from the optical disk, whenever two "one" bits are separated by only one zero bit, or are not separated by any zero bits, a violation of the code has occurred indicating that something has gone wrong; either noise has created an extra "one" bit or something else has gone wrong. In the (2,7) code, the minimum separation of one bits for a valid data signal is 1001.

The purpose of register 400 is to provide an output which allows upcount signals to be generated only when valid counts are decoded by decoder 300 according to the specific run-length limited (RLL) code in use. Suppose, for example, that a (2,7) RLL code is the code in use. Suppose further that the number of clock pulses generated by oscillator 104 equals 20.8 pulses between expected delta times, that is, between those times at which a valid data signal might occur. Since, however, a (2,7) code is in use, the minimum count between valid signals is 62.4 and the maximum count is 166.4.

In this example, while the exact central count for a valid 1001 data signal (FIG. 7, at Δ3) is 62.4 (counter 106 only counts integers), the counts of 61, 62, and 63 can all be programmed in register 400 to indicate a valid data signal. It should be noted that light directed across light path 15 contains both a signal and a noise component. The noise component is introduced in many ways, fluctuations in laser power, laser frequency, media reflectivity, defects in the media, etc. This in combination with noise introduced by the detector 16, produces a jitter in the signal detected on line 100. This is further confounded by the asynchronous relationship of osc 104 and detected signal 100. This combination of events creates a situation in which a valid 1001 could provide counts 61, 62, or 63, and so all of these should be considered valid counts.

Register 400 is programmed to indicate a valid data signal for counts 61, 62 and 63 by raising signals on those particular output lines from register 400 corresponding to those counts. Since the output lines of register 400 are connected to AND gates 403 through 403Z, those three particular AND gates 403 corresponding to counts of 61, 62, and 63 are enabled so that if an actual count of 61, 62, or 63 is decoded by decoder 300, the requirement of the AND gate 403 is satisfied thereby passing a signal to the OR circuit 405 for presentation to the AND gate 407. AND gate 407 is satisfied when the CNT pulse is raised thereby passing an upcount signal to counter 111 over line 110.

In this example, the counts of 60 and 64 might indicate a valid data signal or might indicate noise. Again, this is due to jitter introduced into the detected signal 100 and due to the asynchronous nature of pulses produced by oscillator 104 and the detected signal on line 100. In such a situation, the output lines from register 400 would not be raised since the ability to count a valid data signal is not clear and therefore an upcount is not in order.

To provide for the downcount situation, a register 401 is programmed to provide a raised signal on all lines corresponding to counts 0 through 59. In that manner, those AND gates 404 connected to receive the raised signal are enabled if the actual count provided from decoder 300 is within the range 0-59. In that situation an output is provided to OR circuit 406 for presentation to AND gate 408. Upon the occurrence of the next CNT pulse, a downcount signal is sent to counter 111 over line 112.

In the above example, it should be noted that neither upcount enabling register 400 nor downcount enabling register 401 are programmed to provide a raised output corresponding to counts 60 and 64. As a consequence, if the actual decoded count from decoder 300 is either a 60 or a 64, neither an upcount nor a downcount will be recorded by counter 111. A "no-count" is appropriate in this situation since the presence of a valid data signal or the presence of a noise spike, either one, could be the cause of the decoded count.

In the above example, downcount lines are raised as outputs from register 401 beginning with that line corresponding to a count of 65 and all lines from 65 up to a count of, for example, 80. Upcount lines from register 400 are lines 82, 83 and 84, while "no-count" lines are lines 80 and 85.

FIG. 7 is provided as an example of the location of valid data signals in a (2,7) RLL code. After sensing the initial signal event 500, the next valid signal event should occur after three delta times in order to reach the first expected time for a valid data signal event. Therefore, if the next signal event detected is the signal event 501, a valid time delta between signal events in the (2,7) RLL code has been received. The count accumulated in counter 106 may be designated as any of counts 61, 62, or 63. If the next signal event received after signal event 500 is any of the signal events 501 through 506, a signal event at an expected delta time is received and therefore a valid time delta between signal events is presumed and is counted as an upcount. The accumulated count in counter 106 will be those designated counts around 62.4, 83.2, 104.0, 124.8, 145.6, or 166.4 as shown on FIG. 7.

It should be observed that should a signal event be detected at an unexpected delta time, such as at delta time 507 or at delta time 508, a downcount will occur since the signal event is interpreted as noise. This is the case since a signal event at delta time interval 507 is not in harmony with the (2,7) RLL code and a signal event at delta time interval 508 is occurring between valid delta time intervals for true data.

The circuit of FIG. 6 provides a programmable compare logic circuit in which the contents of the upcount and downcount registers 400 and 401 are established in accordance with the particular RLL code in use. For example, for those particular counts representing an upcount, a value of one is placed in the upcount register, all other counts receive a zero. In the downcount register 401, a value of one is placed in the register for each of those counts for which a downcount is indicated and a zero is placed in the register for those counts representing an upcount or a "no-count." In the case of those particular counts which may be indeterminant, that is a "no-count," a value of zero is placed in both registers 400 and 401. Thus, by establishing values in the registers 400 and 401, a designation is made of the counts that are active for upcounts and those that are active for downcounts.

Referring to FIG. 3, the upcount and downcount lines 110 and 112 from the compare logic circuit 108 are connected to counter 111. Whenever the count in counter 111 exceeds an established threshold upcount, an indication is given that the sector has been written. For example, if counter 111 is a 256 position counter, an output on line 113 may be raised when the 256th count (carry out) is recorded. By raising a signal on line 113 the flip-flop 114 is set, indicating that the sector has been written. Flip-flop 114 remains set to indicate a written sector during the reading of the sector; thereafter, the reset line 115 is raised to reset counter 111 and flip-flop 114.

In order to obtain sufficient statistical accuracy, at least 1,000 and preferably 2,000 timing deltas from the disk should be detected to determine the intervals at which peaks are occurring. In that manner, if an upcount of, for example, 256 is reached within a period of 1,000 events, it has been ascertained with relative certainty that the sector has been written. It should be noted that if the only signals being experienced are generated from noise, some of them will cause the counter to count up and many of them will cause the counter to count down. The result is that the counter will not come near the threshold which would indicate that a sector has been written. With noise, the tendency is to create more downcounts than upcounts. For that reason, the counter must be prevented from rolling over negatively. That is accomplished by raising a signal on line 304 to enable AND circuit 303 (FIG. 5), or AND circuit 408 (FIG. 6) as long as the count in counter 111 is above zero. Whenever the count in counter 111 downcounts to zero, no further downcounts will occur since the AND circuits 303 or 406 will be unsatisfied until a positive count is present once again.

When a signal on line 304 is dropped so that the sector is written, the large number of data signals occurring at interval times within the allowed code spectrum cause the counter 111 to increase its Count far in excess of those signals created from noise. As a result, if a sector is written, the counter 111 quickly builds to a significant count. In that manner, by counting both noise signals and valid signals whenever they occur, a robust system is provided for ascertaining the presence of written data.

While the invention has been described above with respect to specific embodiments, it will be understood by those skilled in the art that various changes in form and details may be made therein without departing from the spirit and scope of the invention which receives definition in the following claims.

What is claimed:

1. Apparatus including a signal detector for detecting data and noise signal events from optical media, each of said data signal events expected to occur at a known time delta from a preceding data signal event, comprising:

clock signal generator means for producing a plurality of pulse signals during said time delta interval;
   first counter means connected to said clock signal generator means for counting the number of clock pulses received during said time delta interval;
   compare logic means connected to said first counter means for comparing the count of said clock pulses received from said first counter means to an expected count and for producing an upcount output signal when the comparison is a match indicating a data signal and for producing a downcount output signal when the comparison is not a match indicating noise, and
   second counter means connected to receive said upcount signal and said downcount signal for counting up or down in accordance therewith;
   whereby said apparatus counts all detected signal events whether from data or from noise and is enabled to produce a significant count in said second counter when a sector on said optical media is written with data, thereby indicating blank sectors when the count in said second counter remains low.

2. The apparatus of claim 1 wherein said compare logic means further includes comparison means for indicating a match for several specific time deltas.

3. The apparatus of claim 2 wherein said comparison means indicates a match for a group of several adjacent pulse counts around a central count at each specific time delta.

4. The apparatus of claim 3 wherein said comparison means is programmable for setting those pulse counts which indicate a match.

5. The apparatus of claim 4 wherein said comparison means is programmable for setting those pulse counts immediately adjacent said group to indicate neither a match nor a no-match.

6. The method of distinguishing between a blank sector and a written sector on an optical disk comprising the steps of:

detecting all signal events produced from said optical disk whether said signal events are resultant from data written on said disk or resultant from noise;
   generating clock pulses at a multiple of the frequency of expected data signal events;
   counting the number of clock pulses produced between detected signal events;
   comparing the count with a predetermined number indicative of the count which is reached when the detected signal event occurs at a time delta at which an expected data signal event would be detected;
   generating an upcount signal when said comparing step produces a match and generating a downcount signal when said comparing step does not produce a match;
   subtracting said downcount signals from said upcount signals to produce a sum; and
   indicating that a sector is written when said sum exceeds a predetermined threshold.

* * * * *